R. B. COCHRANE.
BUTTON MAKING MACHINE.
APPLICATION FILED MAR. 16, 1906.

924,736.

Patented June 15, 1909.
8 SHEETS—SHEET 1.

Fig. 1.

R. B. COCHRANE.
BUTTON MAKING MACHINE.
APPLICATION FILED MAR. 16, 1906.

924,736.

Patented June 15, 1909.
8 SHEETS—SHEET 2.

Fig. 2.

Witnesses
Walter B. Payne
Florence E. Frank

Inventor
Robert B. Cochrane
By Frederick F. Church
His Attorney

R. B. COCHRANE.
BUTTON MAKING MACHINE.
APPLICATION FILED MAR. 16, 1906.

924,736.

Patented June 15, 1909.
8 SHEETS—SHEET 3.

Witnesses
Walter B. Payne
Florence E. Franck

Inventor
Robert B. Cochrane
by Frederick F. Church
his Attorney

R. B. COCHRANE.
BUTTON MAKING MACHINE.
APPLICATION FILED MAR. 16, 1906.

924,736.

Patented June 15, 1909.
8 SHEETS—SHEET 6.

Inventor
Robert B. Cochrane

R. B. COCHRANE.
BUTTON MAKING MACHINE.
APPLICATION FILED MAR. 16, 1906.

924,736.

Patented June 15, 1909.
8 SHEETS—SHEET 7.

UNITED STATES PATENT OFFICE.

ROBERT B. COCHRANE, OF ROCHESTER, NEW YORK, ASSIGNOR TO GERMAN AMERICAN BUTTON COMPANY, OF ROCHESTER, NEW YORK, A CORPORATION OF NEW YORK.

BUTTON-MAKING MACHINE.

No. 924,736.   Specification of Letters Patent.   Patented June 15, 1909.

Application filed March 16, 1906. Serial No. 306,327.

*To all whom it may concern:*

Be it known that I, ROBERT B. COCHRANE, of Rochester, in the county of Monroe and State of New York, have invented certain new and useful Improvements in Button-Making Machines; and I do hereby declare the following to be a full, clear, and exact description of the same, reference being had to the accompanying drawings, forming a part of the specification, and to the reference-numerals marked thereon.

My present invention relates to machines for cutting or turning buttons from work pieces or blanks and it has for its object to provide a machine adapted particularly for cutting buttons from segments of the "ivorynuts" of commerce (*Phytelephas macrocarpa*) which comprises generally a work piece holder, cutting tools and means for controlling their operation to cut or form the buttons from the material at or near the outer surface of the work piece where the stock has the greatest solidity.

Another object of my invention is to provide mechanism for automatically measuring the thickness of a work piece of irregular contour so that its thinnest portion will determine the position of the cutting tools thereby enabling buttons of equal density and hardness to be cut from workpieces of different thickness.

To these and other ends the invention consists in certain improvements and combinations of parts all as will be hereinafter more fully described, the novel features being pointed out in the claims at the end of the specification.

In the drawings.

Similar reference numerals in the several figures indicate similar parts.

Figures 14, 15, 16, 17, 18:
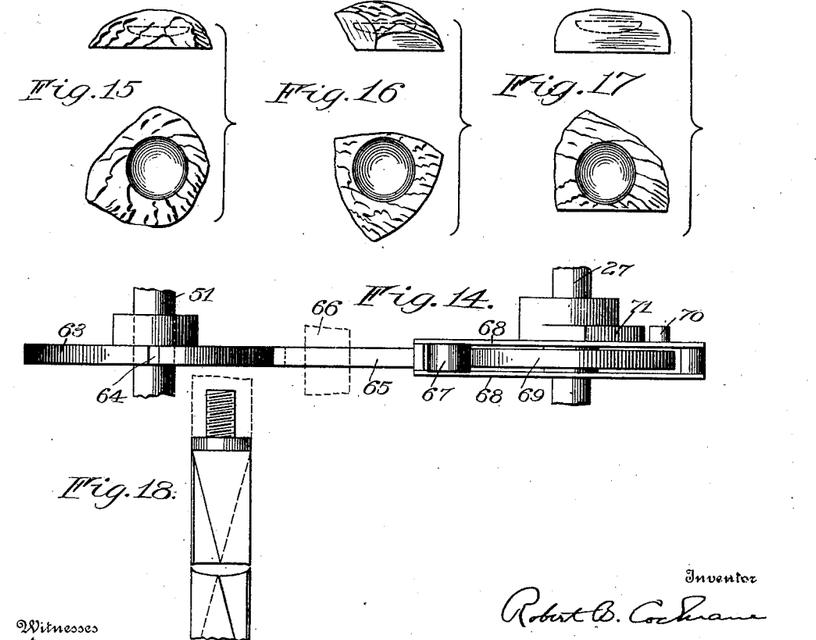
Fig. 14 is a side view thereof.
Figs. 15, 16 and 17 are side and bottom plan views of various forms of the work pieces or blanks from which the buttons are made.
Fig. 18 is a side elevation of a pair of cutting tools shown with their operating ends in juxtaposition.

The work pieces or blanks made from the well known ivory-nut from which the buttons are produced, are made by sawing segments or slabs from the side of the nut so that while the blanks are not uniform in outline or thickness, they each have a flat surface on their inner side. Many of these blanks are thinner toward their edges and this, added to the irregularity of their outer surfaces, has made it difficult to properly center them in a machine in such a manner that buttons cut therefrom may be formed of that portion of the stock which is the hardest and lies nearest the natural outer surface of the segment. Some of the various forms of the latter are illustrated in Figs. 15, 16 and 17, and the most desirable portions of the material from which it is desired to form a button of a given size is indicated by dotted lines in the illustrations showing side elevations of the segments. A machine constructed in accordance with my invention is designed to receive these segments and to subject them successively to the action of roughing and finishing tools which are moved into engagement with the work piece and are adjusted longitudinally by devices which coöperate with the irregular surface of the work piece to control or limit their movement in engagement therewith as they enter its opposite sides.

Figure 1:
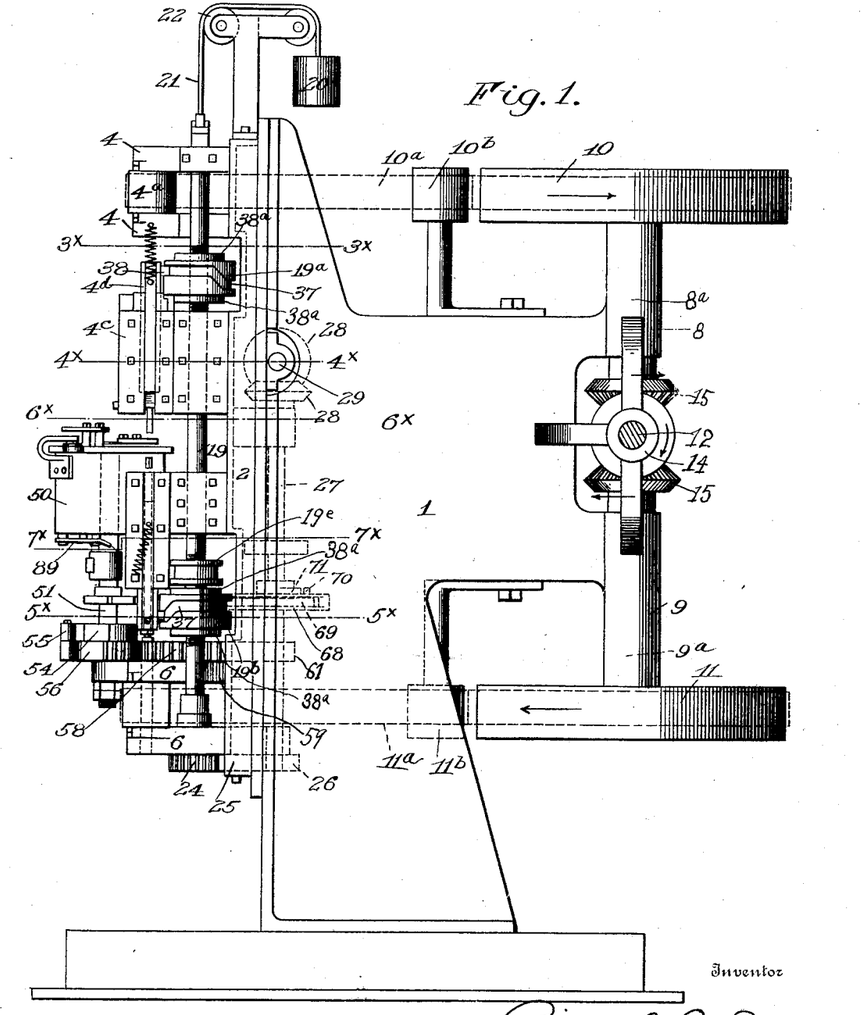
Figure 1 is a side elevation of a button making machine constructed in accordance with my invention.
Figure 5:
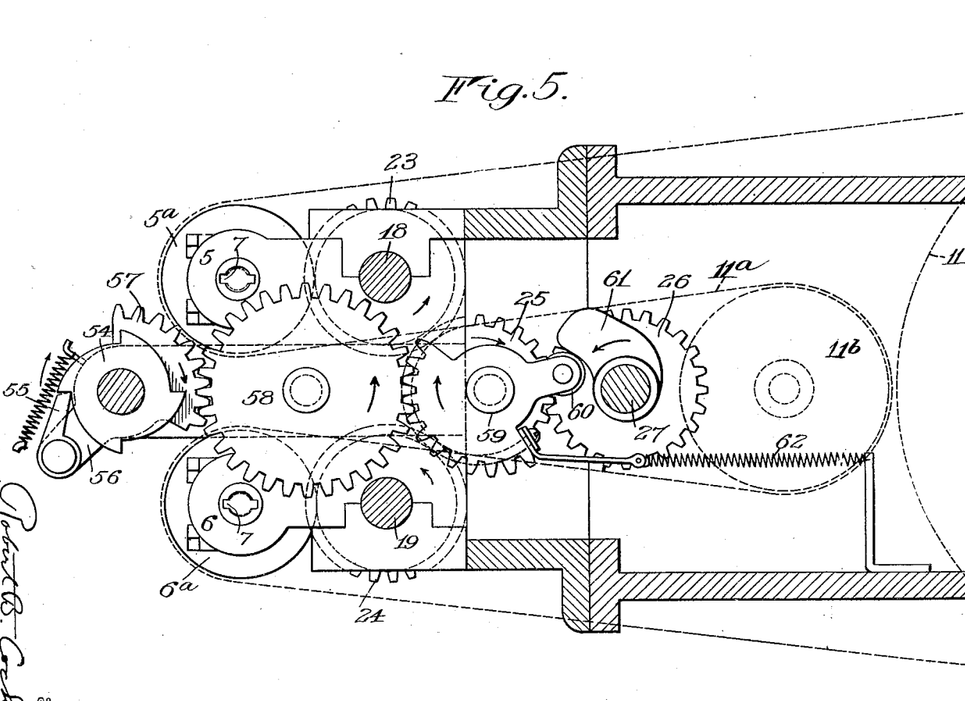
Fig. 5 is a similar view on the line $5^\times 5^\times$ of Fig. 1.

The machine which I have illustrated as showing the present embodiment of my invention comprises a main frame 1 having at its forward side a vertically extending face on which is attached frame piece 2 provided at each side of its upper end with pairs of bearing brackets 3 and 4 and at its lower end with similar pairs of brackets 5 and 6. The brackets 3 and 5 and 4 and 6 are arranged in alinement and between each pair are arranged small pulleys, indicated respectively by $3^a$, $4^a$ and $5^a$, $6^a$, which are secured to tubular arbors journaled in the brackets and provided with longitudinally extending keyways 7, as shown in Fig. 5, in which the keys on the cutter spindles engage for a purpose to be more fully described hereinafter. At the rear of the frame 1 is an extension or bracket having arms 8 and 9 in which are journaled shafts $8^a$ and $9^a$ attached to the pulleys 10 and 11 carrying the belts $10^a$ and $11^a$ which respectively pass around the pulleys $3^a$, $4^a$ and $5^a$, $6^a$ and intermediate idlers $10^b$ and $11^b$, as shown in Figs. 1 and 5. Inasmuch as I prefer to drive the tools operating on opposite sides of the work piece in opposite directions, I arrange the driving shaft 12, carrying a driving pulley 13, in bearings 14 extending at right angles to the shafts $8^a$, $9^a$ and connected to the latter by beveled gear wheels 15.

The cutting tools are adapted to engage opposite sides of the work piece supported in a suitable holder or chuck and to this end they are arranged in pairs of roughing and finishing cutters, the tools of each pair, such as shown in Fig. 18, being located in opposition to each other and attached to longitudinally adjustable spindles which are movable relatively toward and from each other. These spindles indicated respectively by $3^b$, $4^b$, $5^b$ and $6^b$ are guided in bearings $3^c$, $4^c$, $5^c$ and $6^c$ projecting forwardly from the frame piece 2 in alinement with the respective brackets 3, 4, 5 and 6 carrying the spindle driving pulleys to the arbors of which the respective spindles are connected for longitudinal movement by means of keys sliding in the ways 7, as will be understood. On the lateral sides of the several bearings are provided ways in which are mounted slides $3^d$, $4^d$, $5^d$ and $6^d$, each of which is provided with an outer end or arm 16 projecting laterally and embracing its respective cutter spindle between collars 17 rigidly secured thereto, whereby each spindle during its rotary movement may be reciprocated longitudinally in its bearing by an adjustment of its respective slide. Arranged in rear of the roughing cutter spindles $3^b$ and $5^b$ is a shaft 18, journaled at its upper and lower ends in one of each of the pairs of brackets 3 and 5, and similarly positioned in rear of the finishing cutters is a shaft 19, journaled in one of each of the brackets 4 and 6. In a machine such as I have shown, where the spindles extend in a vertical direction, the shafts 18 and 19 are counter-balanced by means of weights 20 to which they are attached by flexible connections 21 passing over pulleys 22 arranged at the top of the frame of the machine. These shafts are splined at their lower ends to the hubs of gear wheels 23 and 24, supported upon the lowermost of the brackets 5 and 6, which intermesh with an idler pinion 25, journaled at the bottom of the frame piece 2, with which coöperates a gear wheel 26 on a counter shaft 27 connected by bevel gear wheels 28 with a driving shaft 29 supported in the bearings 30. One end of the driving shaft extends laterally of the machine and supports a driving pulley 31 which is connected to the shaft by movable clutch devices. In the present instance the pulley is provided at its inner side with pins 32 which coöperate with the collar 33 and may be disengaged therefrom, against the tension of the spring 34, by means of an operating arm 35 connected by a rod 37 to a treadle 38 which may be moved downwardly, to the position indicated by dotted lines in Fig. 2, and secured beneath a projection 39 when it is desired to arrest the movement of the shaft 29 and the shafts 18 and 19 connected thereto.

The relative movement of the opposed cutters or tools of each pair is effected by means of cams carried on the shafts 18 and 19, as shown in Fig. 1, and indicated in dotted lines 3, 4, 6 and 7. The cams carried on the shaft 18 are designated as $18^a$ and $18^b$ while those on the shaft 19 are indicated by $19^a$ and $19^b$, and each of them is provided with a cam slot 37 in which rests a roller 38 carried on a small lateral projection on the corresponding slides $3^b$, $4^b$, $5^b$ and $6^b$, whereby each complete revolution of the shafts 18 and 19 will cause the coöperating pairs of cutters to be advanced into engagement with the opposite sides of the work piece and retracted again to their normal position. One of the cams on the shaft 19 has its slot 37 made slightly different from the corresponding slots of the other cams so that one of the finishing cutters is advanced a short distance after its coöperating cutter has begun to retreat for the purpose of severing the button from the ring of the work piece blank permitting it to be discharged or drawn away by any suitable device such as a suction spout (not shown). The cams $18^a$ and $18^b$ and $19^a$ and $19^b$ are preferably splined on their respective shafts and are adjustable longitudinally thereon being secured by means of lock nuts $38^a$ enabling the cutters to be arranged to cut buttons of different thicknesses and to also provide means for compensating for the wear of the edges of the cutters both from use and the frequent sharpening operations to which they are subjected.

The holder or chuck for supporting a work piece is arranged to present it successively to the operation of the roughing and finishing cutters and to increase the capacity of the machine the holder is adapted to contain a plurality of work pieces it being in the present instance shown arranged to receive four blanks two of which are operated upon simultaneously, one being engaged by the roughing cutters and another by the finishing cutters. The holder also comprises devices for releasing the blank from which a button has been cut from the third set of gripping devices while the operator is inserting a fresh blank in the fourth set of said devices. In carrying out this feature of my invention I also provide mechanism coöperating with the irregular surface of each work piece which measures its thickness and controls or limits the movement of the tools in proportion thereto so that the button is cut from the hardest portion of the stock lying in proximity to the irregular surface of the work piece or blank. This portion of the mechanism is supported centrally on the frame piece 2 and comprises in part a cylindrical ring 50, supported for convenience at the outer ends of and above the bearings 5ᶜ, 6ᶜ, in which is journaled a revoluble turret attached to a shaft 51 and comprising a plate 52 having a laterally projecting edge or rim, overhanging the ring 50, and provided with a plurality of apertures surrounded by rings 53 having serrated edges forming the work piece supports to which the work pieces are secured. These rings are spaced equidistantly about the circumference of the plate 52 and they are of such diameter that the tools on the spindles 5ᵇ and 6ᵇ may readily pass upwardly through the holders into engagement with the lower sides of the work pieces.

The turret is revolved intermittently by means of a ratchet wheel 54, secured to the lower end of the shaft 51, with which coöperates a spring operated pawl 55 mounted upon a rock plate 56 provided with gear teeth 57 meshing with an idler 58 oscillated by a second rock plate 59, journaled on the frame piece 2, having a rearwardly extending arm, carrying a roller 60, actuated periodically by a cam 61 on the shaft 27. The arrangement of these parts is shown in detail in Fig. 5, and from an inspection of this figure it will be seen that upon each revolution of the shaft 27 the turret will be advanced a one-quarter revolution, the operating parts being returned to their normal position by a spring 62 connected to the plate 59.

Figure 13:
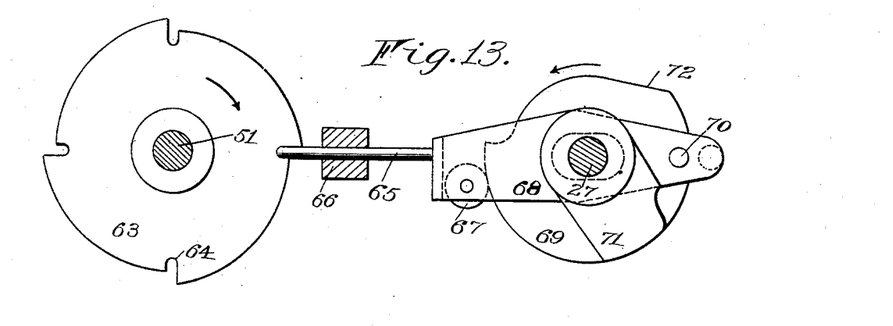
Fig. 13 is a detail view showing the turret locking mechanism.

Locking devices are employed for rigidly securing the turret after each adjustment comprising a disk 63 secured to the shaft 51 and provided with notches 64, corresponding to the teeth of the ratchet 54 and the work piece holders, in which engages a locking bar 65 reciprocated into and out of operative position by suitable cams on the shaft 27. The bar 65 is movably supported in a stationary guide 66, arranged in proximity to the disk 63, and it is attached at its rear end to a frame carrying a roller 67 and having side arms 68 straddling a cam 69 and provided with elongated apertures through which the shaft 27 projects. Carried on one of the arms 68 is a pin 70 with which coöperates a cam 71. The latter is adapted to retract the locking bar and it is arranged relatively to the cam 69, which projects the bar into operative position, the operating surfaces of the two cams being arranged relatively to the turret rotating cam 61 so that the shaft 51 is released before the cam 61 actuates the connecting parts to revolve the turret, the latter being subsequently locked by the action of the cam 69 when it has been moved a quarter revolution. In order to prevent an overthrow or advance movement of the turret the portions of the edge of the disk 63, lying between the slots 64, are cut spirally, as shown in Fig. 13, and the cam 69 is provided with a surface 72 which begins to advance the locking bar before the movement of the turret is completed.

The mechanism coöperating with the work pieces for measuring their thickness is carried on the turret, there being one of such mechanisms for each holder or chuck, and the parts set thereby and controlling the axial position of the cam shafts 18 and 19 are locked beneath the turret and are operated successively as the latter is rotated intermittently to adjust the cam shafts to effect the relative movement of the tools or cutters relatively to the work piece holder or chuck in proportion to the thickness of the work piece.

Owing to the irregularity in the contour of the work pieces from which the buttons are cut, which causes them to be of greater thickness in some points than at others, and as the position of the button in the blank or work piece must be determined by its thinnest portion, I employ a plurality of fingers which are adapted to coöperate with different points on the surface of the work piece. These fingers may also be employed as gripping devices for securing the work pieces in position on the holders there being one set for each of the rings 53 on the plate 52. The turret is constructed with a lower end or head 73 and an upper end or head 74 to which the plate 52 is rigidly attached, the space between said heads being divided into chambers, corresponding to the several work piece holders, by partitions 75, the inner ends of which are led into recesses or notches in the shaft 51 and are provided at their outer ends with packing 76 fitting tightly against the inner wall of the ring 50.

Figure 4:
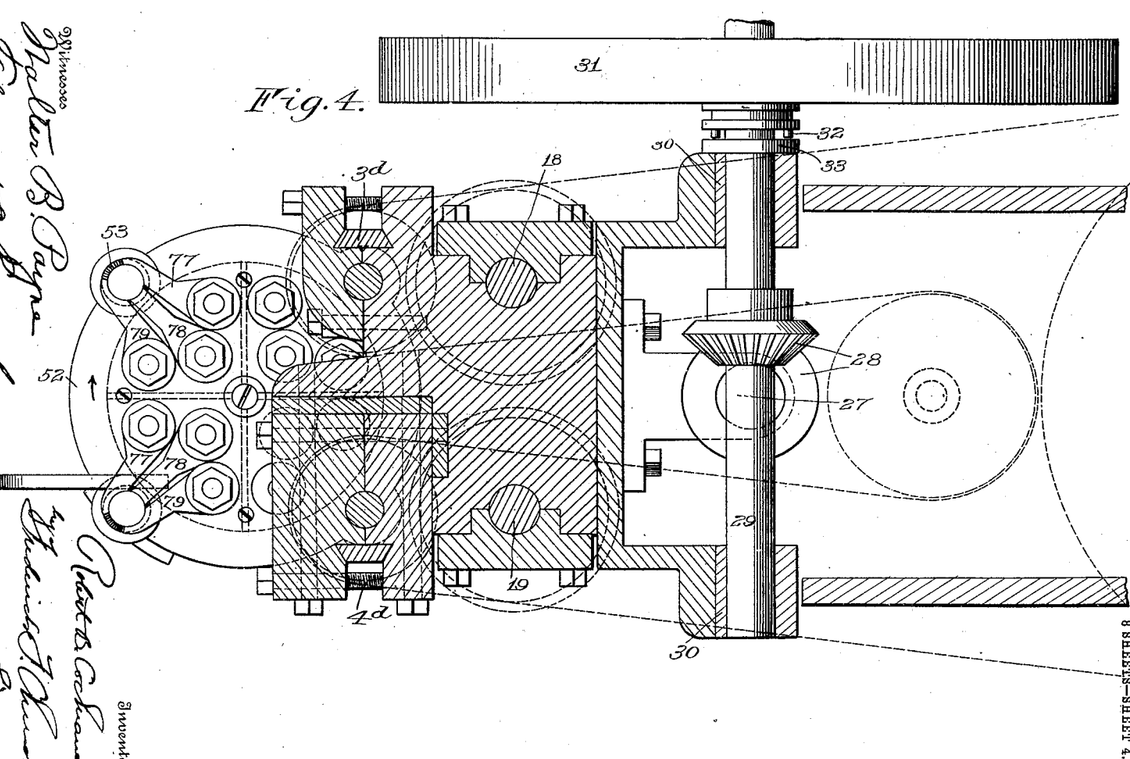
Fig. 4 is a similar view on the line $4^\times 4^\times$ of Fig. 1.
Figure 6:
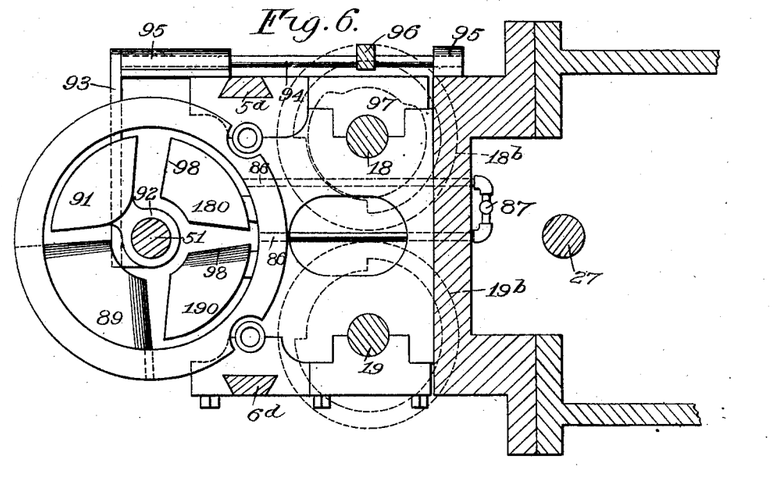
Fig. 6 is an enlarged sectional view on the line $6^\times 6^\times$ of Fig. 1, the revoluble turret being removed and other portions of the machine omitted to show underlying parts.
Figure 7:
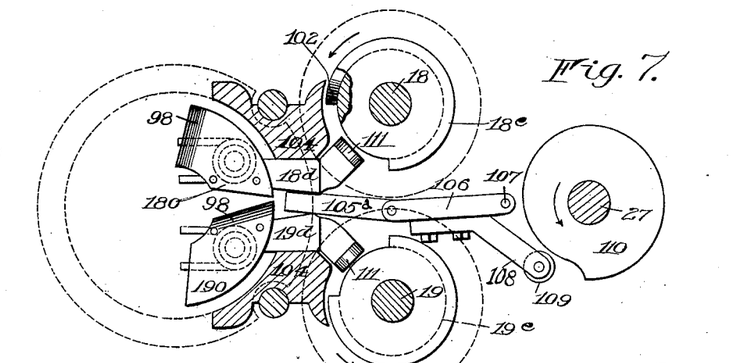
Fig. 7 is a detail horizontal sectional view taken on the line $7^\times 7^\times$ of Fig. 1, illustrating the locking mechanism.
Figure 8:
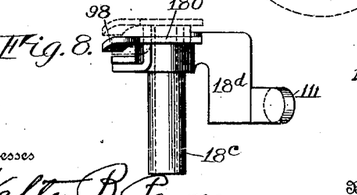
Figs. 8 and 9 are detail side and front elevations respectively of one of the adjustable members controlling the cam shafts.
Figure 9:
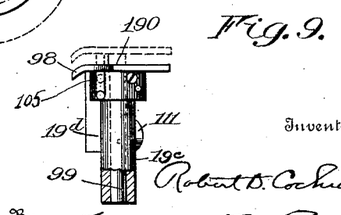
Figures 10, 11, 12:
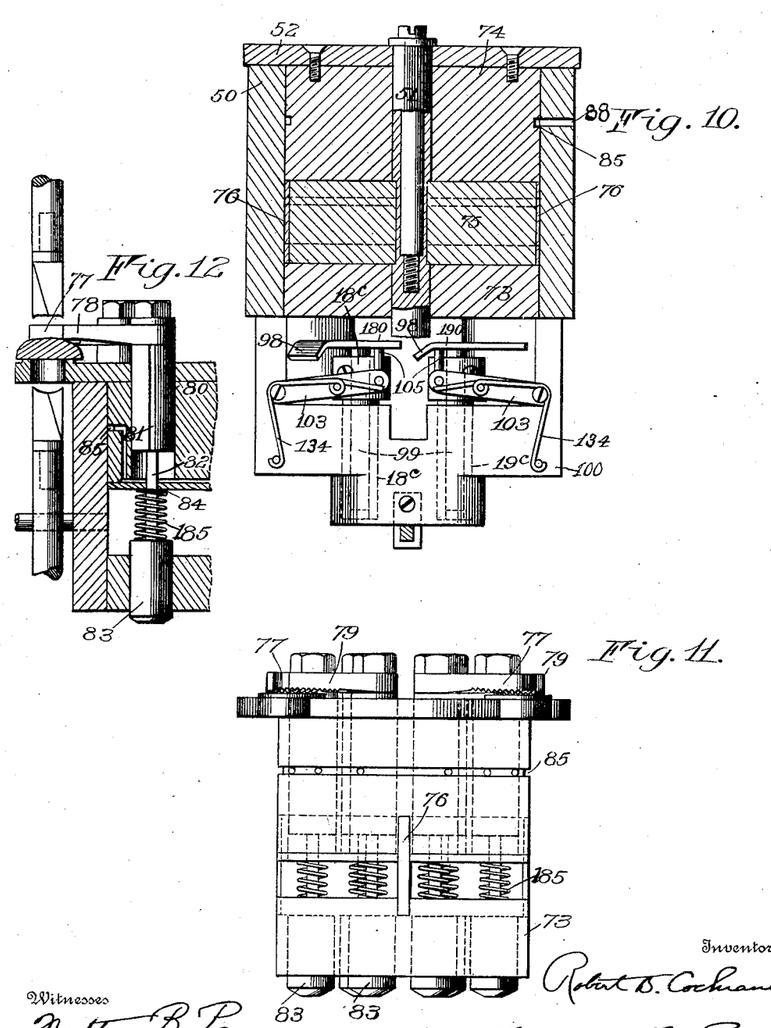
Fig. 10 is a front elevation of the parts illustrated in Figs. 6 and 7 the turret and its support being shown in section.
Fig. 11 is a detail side elevation of the turret removed from its support.
Fig. 12 is a detail view of one of the gripping devices and its connected parts.

The measuring and gripping devices coöperating with the rings 53 are similar in construction and a description of one of them will suffice for all. Arranged in the space provided between the adjacent faces of the side walls of each chamber are pistons the upper ends of which project beyond the head 74 and are provided with work piece engaging fingers projecting outwardly over the work piece holders or rings 53. These fingers, indicated by 77, 78 and 79, are arranged side by side, as shown in Fig. 4, the faces at the ends of the two outer fingers being adapted to engage the surface of the work piece near its edges while the third finger is arranged to engage the edge of said surface at an intermediate point, the ends of said fingers being adapted not only to engage different points on the work piece but also to permit the engagement of the tools carried on the spindles 3$^b$ and 4$^b$ therewith. The pistons on which the fingers 77, 78 and 79 are mounted comprise the guides 80 operating longitudinally in the head 74 and prevented from rotation thereon by keys 81, as will be understood. Attached to the lower ends of each of the guides 80 is the stem 82 attached to a piston head 83, guided in the end 73 of the turret, and having its end projecting beyond the latter. The stems 82 are surrounded by packing 84 and coil springs 185 which operate to move their respective measuring and gripping fingers downward toward their work piece holder to temporarily secure a work piece in operative position. The gripping fingers are forced down upon the blanks to secure them rigidly in place, during about one-half of the revolution of each quadrantal section of the turret, so that they can sustain the action of the roughing and finishing cutters without displacement, and for accomplishing this I employ air or other fluid under pressure which is introduced successively to the various chambers as the work pieces are positioned beneath the cutters. For this reason small passages are provided in the head 74 of the turret, leading from each chamber and terminating in ports 85, which engage successively with inlet ports 86, at the inner side of the ring 50, supplied with air or other fluid by the branches of an air supply pipe 87, as shown in Fig. 6. An outlet port 88 is also provided in the ring and located at such a point that the pressure introduced through the chambers will be relieved after the operation of the finishing cutters is completed. The gripping fingers at one point in the rotation of the turret are elevated, by engagement with the bevel edge of a stationary plate 89, to release the blank after the button has been severed therefrom to permit it to be removed by a scraper 90 supported on the ring 50.

Figure 2:
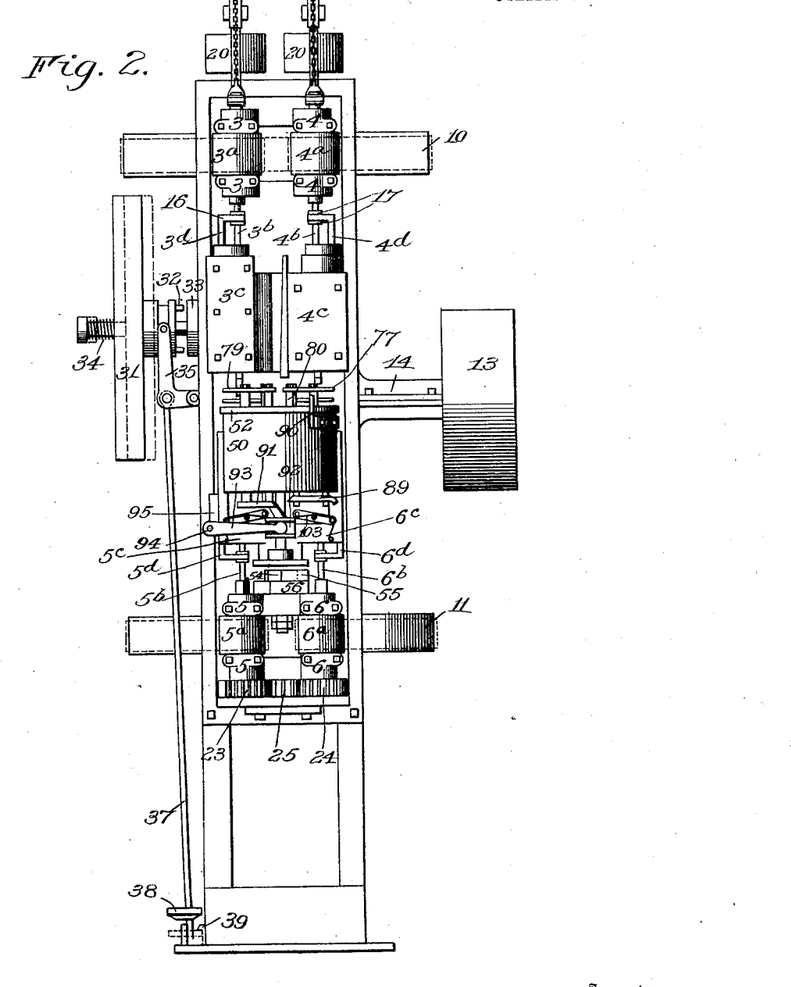
Fig. 2 is a front elevation thereof.
Figure 3:
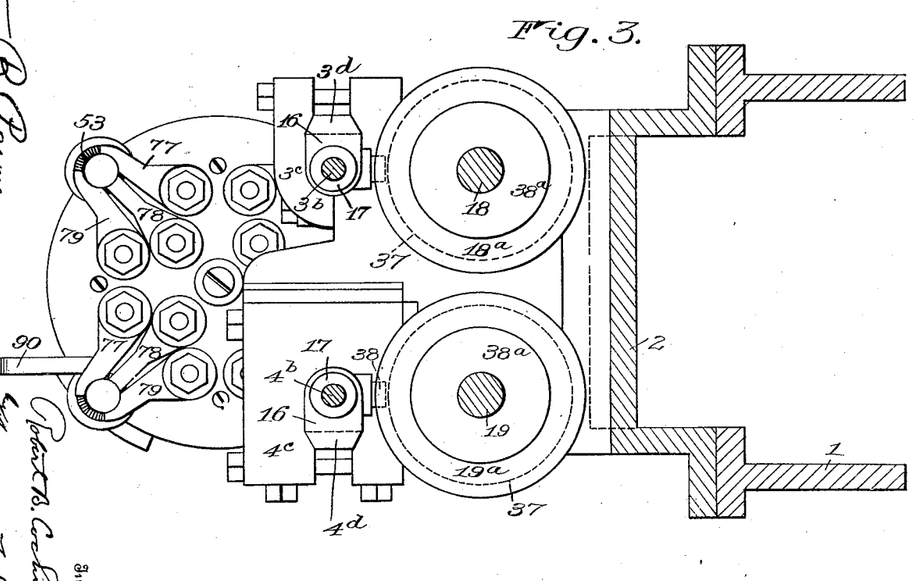
Fig. 3 is an enlarged horizontal sectional view on the line $3^\times 3^\times$ of Fig. 1.

In order to hold the fingers in elevated position to allow an operator to insert a fresh work piece and to permit them to descend simultaneously into engagement therewith a movable plate 91 is located in alinement with the plate 89, as shown in Figs. 2 and 6. This plate is supported upon a vertically movable collar 92 surrounding the shaft 51 and connected by an arm 93 to a rock shaft 94, journaled in bearings 95, having an arm 96 actuated by a cam 97 (shown in dotted lines in Fig. 6) arranged on the shaft 18 which releases the plate 91 and permits all of the gripping fingers to descend simultaneously to grasp and center a work piece.

Arranged beneath the turret and in position to be engaged by one or more of the pistons of each set of the gripping devices when their work piece holders are in alinement with the roughing and finishing cutters, are two members for actuating the cam shafts 18 and 19 longitudinally. These members comprise quadrantal shaped plates, 180 and 190, having beveled edges 98, and supported upon studs or pins 99 movable vertically in sleeves 18$^c$, 19$^c$ supported in guides in a frame piece 100 in rear of the turret shaft 51. Extending rearwardly and downwardly from each of the sleeves are arms 18$^d$ and 19$^d$ the ends of which project into proximity to the shafts 18 and 19 and carry contact pieces 111. Pivoted to part 100 of the frame are small lever arms 103, operated upwardly by springs 134 and pivotally connected to the sleeves 18$^c$ and 19$^c$ and to the ends of downwardly extending pins 105 on plates 180 and 190 the object of said arms being to yieldingly support the members or plates and to normally move both the plates and sleeves upwardly and actuate the former a distance twice that of the latter. Now, as the turret is revolved it will be seen that the lowermost piston of each set will engage the plate 180 and also cause a depression of the sleeve 18$^c$ and upon a succeeding movement of the turret said piston will also operate the plate 190 and adjust the sleeve 19$^c$ so that for a given blank the members 180 and 190 will be adjusted in alinement and the roughing and finishing cutters positioned relatively thereto.

On the shafts 18 and 19 are cams 18$^e$ and 19$^e$ provided with circumferential grooves each adapted to receive one of the contact pieces on arms 18$^d$ and 19$^d$, whereby said shafts are, when rotated, moved axially according to the movement imparted to the adjusting devices 180 and 190, after these parts are set by the gripping devices. Owing to the weight of the shafts "18" and "19", the friction of the latter in their bearings and also to the comparative delicacy of the adjustment of the parts which determine the position of the shafts, means are provided for disconnecting the latter from said parts after each cutting operation and locking the adjusting devices after they are set in the desired position by the gripping devices and before the shafts are operated. To this end each of the cams is provided with a cut-away portion which is in alinement with the ends of the aforementioned arms "18$^d$" and "19$^d$" when the shafts are at rest, or at that time when the adjustment of the plates 180 and 190 takes place. The forward ends of the cam grooves are provided with beveled surfaces 102 leading from each side thereof, which will cause the cam shafts to be adjusted axially in one direction or the other, according to the position of the coöperating contact pieces 111 with reference to the central plane of the cam.

In order to lock the cam shaft setting devices in operative position the part 100 of the frame is provided with rearwardly extending prolongations 104 arranged at the outer sides of arms 18$^d$ and 19$^d$ and the latter are forced into engagement therewith by a wedge piece 105$^a$ supported at the outer end of a toggle lever 106 journaled to the frame at the point 107 and having attached thereto an arm 108 carrying the roller 109 with which a cam 110 on the shaft 27 engages, after each adjustment of the members 180 and 190 has taken place. The wedge 105 retains the arms 18$^d$ and 19$^d$ in locked position during a complete rotation of each of the shafts 18 and 19, so that the latter are first shifted axially by the inclined surfaces 102 of the cams 18$^e$ and 19$^e$ and then retained in their position of adjustment by the rollers 111 lying in the cam grooves during the operation of their respective cutting tools.

A button making machine constructed in accordance with my invention is compact and capable of adjustment to cut buttons varying in diameter and thickness and although I have confined my description to its operation upon a particular material it will be understood that it is equally well adapted for working other substances and may also be employed for purposes other than those described.

I claim as my invention:

1. In a machine for making buttons, the combination with a holder for work pieces of irregular contour comprising a plurality of fingers adapted to engage different points on the surface of a work piece, of a button forming tool, means for causing a relative movement of the holder and tool and means so located as to be controlled by one of the fingers for limiting said movement.

2. In a machine for making buttons, the combination with a holder for work pieces of irregular contour comprising fingers adapted to engage different points of elevation on the surface of a work piece, of a button forming tool movable relatively to the holder and means so located as to be controlled by one of the fingers for limiting the movement of the tool.

3. In a machine for making buttons, the combination with a holder for work pieces of irregular contour comprising a plurality of fingers adapted to engage relatively high and low points on the surface of a work piece, of a button forming tool, means for causing a relative movement of the holder and tool and means so located as to be controlled by the finger engaging the lowest point of the work piece for limiting said movement.

4. In a machine for making buttons, the combination with a holder for work pieces of irregular contour comprising independently movable fingers adapted to engage relatively thick and thin portions of the work piece, of a button forming tool, means for imparting a relative movement of the holder and tool and devices adapted to be controlled by the finger engaging the thinner part of the work piece for limiting said movement of the tool and holder.

5. In a machine for making buttons, the combination with a holder comprising a face plate, a plurality of fingers adjustable relatively to the face plate to engage relatively thick and thin portions of a work piece of irregular contour and secure it to the face plate, of a tool, means for moving the face plate and tool relatively and devices for limiting said movement controlled by one of the fingers.

6. In a machine for making buttons, the combination with a work piece support, a button forming tool, and means for moving one of said parts relatively to the other, of a measuring device separate from the tool coöperating with a work piece and limiting the travel of the movable part in one direction.

7. In a machine for making buttons, the combination with a work piece support, a button forming tool and means for moving one of said parts relatively to the other, of an adjustable measuring device mounted on the support and coöperating with the surface of a work piece to limit the travel of the movable part in proportion to the thickness of the work piece.

8. In a button making machine, the combination with a work piece holder, and a button forming tool movable relatively thereto, of mechanism coöperating with the surface of a work piece to measure its thickness and devices actuated by said mechanism for controlling the tool in its movement toward the holder.

9. In a button making machine, the combination with a work piece holder and a button forming tool movable relatively thereto, of mechanism mounted on the holder for automatically measuring the thickness of a work piece and limiting the movement of the tool in engagement therewith.

10. In a button making machine, the combination with a holder for a work piece comprising a support against which one side of a work piece rests, a button forming tool and means for causing a relative movement of the holder and tool, of mechanism separate from the tool movable relatively to the holder and coöperating with the other side of the work piece and limiting the movement of said parts in proportion to the thickness of the work piece.

11. In a machine for making buttons, the combination with a work piece holder, a tool and means for moving said parts relatively, of mechanism movable relatively to and from the holder to clamp a work piece thereon and devices actuated by said mechanism for controlling the relative movement of tool and holder.

12. In a machine for making buttons, the combination with a work piece holder, a button forming tool and means for operating said parts relatively to each other, of mechanism for measuring the thickness of a work piece comprising a plurality of fingers coöperating with different points on the surface thereof and devices actuated by said mechanism controlling the relative movement of the holder and tool.

13. In a machine for making buttons, the combination with a work piece holder and a relatively movable button forming tool, of mechanism carried on the holder and movable relatively thereto for measuring the thickness of a work piece comprising a plurality of fingers coöperating with different points on the surface of the work piece and means controlled by said measuring mechanism for limiting the relative movement of the holder and tool a distance proportional to the thickness of the work piece.

14. In a machine for making buttons, the combination with a work piece holder comprising a support against which one side of a work piece rests, a tool and means for causing a relative movement of said parts, of mechanism for securing the work piece to the support by engagement with the other side thereof and devices so located as to be actuated by said mechanism for limiting the relative movement of the holder and tool in proportion to the thickness of the work piece.

15. In a machine for making buttons, the combination with a work piece holder comprising a support against which one side of a work piece rests, a tool and means for causing a relative movement of said parts, of mechanism movable relatively to the support comprising a plurality of independently movable measuring fingers coöperating with the other side of the work piece to clamp it on the support and devices adapted to coöperate with one of said fingers for limiting the relative movement of the holder and tool.

16. In a machine for making buttons, the combination with an intermittently revoluble turret comprising a plurality of work piece holders, a tool and means for causing a relative movement of the turret and tool, of separate measuring mechanisms adapted to coöperate with a work piece on each holder, and mechanism actuated successively by each of said measuring mechanisms for controlling the relative movement of the turret and tool.

17. In a machine for making buttons, the combination with an intermittently revoluble turret comprising a plurality of work piece holders, a tool and means for causing a relative movement of the turret and tool to cause the tool to engage each work piece, of a measuring device for each holder carried on the turret and arranged to be set in operative position by engagement with a work piece and mechanism actuated by said measuring devices for controlling the relative movement of the turret and tool, in proportion to the thickness of the work piece.

18. In a machine for making buttons, the combination with an intermittently revoluble turret comprising a plurality of work piece holders, a tool and means for causing a relative movement of the turret and tool toward and from each other, of a measuring device for each holder, carried on the turret comprising a plurality of independently movable parts set in operative position by engagement with different portions of a work piece and mechanism actuated by one of the movable parts of each of said measuring devices for controlling the relative movement of the turret and tool.

19. In a machine for making buttons, the combination with an intermittently revoluble turret provided at one end with a plurality of work piece holders, a tool and means for causing a relative movement of the turret and tool to cause the latter to engage the work piece, of a device for engaging a work piece in each holder having a part located at the other end of the turret and means at this end of the turret actuated by said part for limiting the relative movement of the turret and tool.

20. In a machine for making buttons, the combination with an intermittently revoluble turret provided at one end with a plurality of work piece holders, a tool and means for causing a relative movement of the turret and tool to cause the latter to engage the work piece, of a separate device coöperating with each of the work pieces in the several holders each having a part projecting beyond the other end of the turret and means at this end of the turret actuated successively by said part of each device for limiting the relative movement of the tool and turret for each work piece carried by the latter.

21. In a machine for making buttons, the combination with an intermittently revoluble turret and a plurality of gripping devices each comprising a plurality of work piece engaging members guided on the turret, of a tool, means for causing a relative movement of the turret and tool to cause the latter to engage the work piece for each gripping device and means successively actuated by one of the work piece engaging members of each gripping device for limiting the relative movement of the turret and tool.

22. In a machine for making buttons, the combination with a work piece holder, button forming tools arranged at opposite sides of the holder and means for moving them relatively thereto into engagement with and positioned by a work piece and mechanism arranged to coöperate with the latter having connection with both tools for limiting their movement.

23. In a machine for making buttons, the combination with a work piece holder, button forming tools arranged to coöperate with opposite sides of a work piece in the holder which are movable relatively to each other to cause them to engage the work piece and are adjustable relatively to the holder, of mechanism arranged to engage a work piece and having connection with the tools for controlling their movement relatively to the holder in proportion to the thickness of the work piece.

24. In a machine for making buttons, the combination with a work piece holder, button forming tools arranged to coöperate with opposite sides of a work piece in the holder which are movable inwardly and outwardly toward and from each other to cause them to engage the work piece and means for adjusting their initial position relatively to the holder, of mechanism arranged to coöperate with a work piece and having connection with said means for controlling the position of the tools in proportion to the thickness of the work piece.

25. In a machine for making buttons, the combination with a work piece holder, button forming tools arranged in opposition to each other and movable relatively into and out of engagement with opposite sides of a work piece, of supports for said tools, means for adjusting them relatively to the holder and mechanism arranged to coöperate with a work piece arranged in the holder and having connection with the adjusting means to control its adjustment to agree with the thickness of the work piece.

26. In a machine for making buttons, the combination with a work piece holder, button forming tools arranged in opposition to each other, supports therefor and means for moving the tools to position their operating ends in juxtaposition in engagement with opposite sides of a work piece in the holder, of means arranged to coöperate with a work piece in the holder and having connection with the tool-moving means for controlling the positions of the ends of the tools relatively to the sides of the work piece in proportion to the thickness of the latter.

27. In a machine for making buttons, the combination with a holder adapted to receive work pieces having front and rear side faces, button forming tools arranged in opposition to each other and adapted to enter the two faces of a work piece and means for moving the tools relatively to position their operating ends in juxtaposition, of means arranged to coöperate with the work piece and having connection with the tool-moving means to control the position of both tools relatively to the respective faces of the work piece in proportion to the thickness of the latter.

28. In a machine for making buttons, the combination with a holder adapted to receive a work piece having front and rear faces, button forming tools adapted to enter each of said faces and means for operating them relatively to the holder to cause them to engage the work piece, of means arranged to coöperate with the work piece and arranged to limit both tools in their movement toward the holder to agree with the thickness of the work piece.

29. In a machine for making buttons, the combination with a holder adapted to receive a work piece having front and rear faces, boring tools adapted to enter each of said faces and means for operating them to cause them to engage the work piece, of mechanism arranged to coöperate with the work piece and having connection with the tools for limiting the depth of the boring action of each tool relative to the respective face of the work piece in proportion to the thickness of said work piece.

30. In a machine for making buttons, the combination with a holder adapted to receive a work piece having front and rear faces, boring tools adapted to enter each of said faces and means for operating them relatively toward each other simultaneously to cause them to engage the work piece and to arrest them with their cutting ends separated a predetermined distance, of mechanism arranged to coöperate with the work piece and having connection with the tools for controlling the movement of the tools to position the uncut intermediate portion of the work piece between the tools relatively to one of its faces.

31. In a machine for making buttons, the combination with a work piece holder comprising an apertured support against which one side of a work piece rests, clamping devices arranged to coöperate with different points on the other side of the work piece, of a tool adapted to pass through the aperture in the support, a second tool adapted to engage the work piece between said clamping devices and means adapted to be set by the latter having connection with the tools for controlling their movement toward the work piece in proportion to the thickness of said work piece.

32. In a machine for making buttons, the combination with a work piece support having a chamber, of clamping fingers extending over the support, pistons arranged in the chamber and connected to the fingers and means for supplying fluid under pressure to the chamber.

33. In a machine for making buttons, the combination with an intermittently revoluble turret provided with a plurality of chambers having inlet ports and a work piece support corresponding to each chamber, of clamping fingers extending over each support, pistons in the several chambers connected to the fingers and means for supplying fluid under pressure to the chambers.

34. In a machine for making buttons, the combination with an intermittently revoluble turret provided with a plurality of chambers having inlet ports and a work piece support corresponding to each chamber, of a plurality of pistons arranged in sets in each chamber, a finger attached to each piston, those of each set coöperating with their respective work piece supports, and means for supplying fluid under pressure successively to the several chambers.

35. In a machine for making buttons, the combination with a work piece support, of axially movable revoluble button cutters for coöperating with opposite faces of the work piece, means for operating them and mechanism for automatically adjusting the cutters axially relatively to the support in proportion to the thickness of the button blank.

36. In a machine for making buttons, the combination with a work support, of an axially movable revoluble button cutter, means for operating it, and mechanism for automatically adjusting the cutter axially relatively to the support in proportion to the thickness of the button blank.

37. In a machine for making buttons, the combination with an intermittently revoluble work support, of a plurality of grips carried by the support, pistons adapted to operate the grips, and means for supplying fluid under pressure to the pistons during a portion of the revolutions of the work support.

38. In a machine for making buttons, the combination with a movable tool, of an intermittently revoluble work support, a plurality of sets of grips thereon, pistons for operating the grips, means for supplying fluid under pressure to the pistons during a portion of the revolution of the work support, and mechanism adapted to be operated by the pistons in each set for adjusting the position of a tool relatively to the work support.

39. In a machine for making buttons, the combination with a work support and an axially movable cutter, of an axially movable cam shaft adapted to actuate the cutter relatively to the support to cause the cutter to engage a work piece on the said support, and mechanism adapted to be operated by a work piece on the work support and to coöperate with the cam shaft to set it in a position corresponding to the thickness of a work piece.

40. In a machine for making buttons, the combination with a work piece support, a gripping device thereon and a revoluble cutter, of an axially movable cam shaft adapted to operate the cutter relatively to the work piece support to cause the cutter to engage a work piece on said support, mechanism adapted to be operated by the gripping device for moving the cam shaft axially to correspond to the thickness of the work piece, and means for locking the cam shaft in its adjusted position.

41. In a machine for making buttons, the combination with a work piece support, and a gripping device thereon, of axially movable roughening and finishing cutters, a movable cam shaft adapted to operate the cutters relative to the work piece support, and mechanism adapted to be operated by the gripping device for separately adjusting the cam shaft.

42. In a machine for making buttons, the combination with an intermittently revoluble work support, and a gripping device thereon, of axially movable roughening and finishing cutters, an adjustable cam shaft adapted to actuate the cutters relatively to the work support, mechanism adapted to be operated by the gripping device for separately adjusting the cam shaft, and means for locking them.

43. In a machine for making buttons, the combination with an intermittently revoluble work support, a gripping device thereon, and axially movable revoluble cutters, of axially movable cam shafts, means for rotating the cutters and cam shafts, mechanism adapted to be operated by the gripping device for separately moving the cam shafts axially, and means for locking the said mechanism.

44. In a machine for making buttons, the combination with an intermittently revoluble work support, a plurality of sets of gripping devices movable to clamp a work piece on the support, pistons for operating said gripping devices, means for supplying fluid under pressure to the pistons during a portion of the revolutions of the work support, and a member adapted to coöperate with the pistons to open the gripping devices for the insertion of a work piece.

45. In a machine for making buttons, the combination with an intermittently revoluble work piece support, and gripping devices thereon movable to clamp a work piece on the support, of an axially movable revoluble cutter, an axially movable cam shaft, a yieldingly supported adjusting member adapted to be set in operative position by the gripping devices, and mechanism adapted to be actuated by the member for moving the cam shaft relatively to the work support to cause a cutter to engage a work piece on said support.

46. In a machine for making buttons, the combination with an intermittently revoluble work support, and gripping devices thereon movable to clamp a work piece on the work support and arranged in sets, and axially movable revoluble cutters, of a yieldingly supported member adapted to be adjusted in operative positions by one of the gripping pieces of each set, an axially movable cam shaft, mechanism adapted to be operated by the member for automatically adjusting the cam shaft relatively to the work support, and devices for locking said shaft in its adjusted position.

47. In a machine for making buttons, the combination with an intermittently revoluble work support, of gripping devices thereon movable to clamp the work piece on the work support, and longitudinally movable and revoluble roughening and finishing cutters, of an adjustable cam shaft arranged to coöperate with each cutter, yieldingly supported members adapted to be set by the gripping devices and to coöperate with the axially movable cam shaft to adjust them axially relatively to the work support.

48. In a machine for making buttons, the combination with an intermittently revoluble work support, a plurality of gripping devices thereon, and longitudinally movable and revoluble roughening and finishing cutters, of an adjustable shaft for each cutter, cams on said shaft adapted to operate the cutters relatively to the work support, yieldingly supported adjusting members adapted to be set by the gripping devices, means on the shafts engaging the respective members to adjust said shafts, and mechanism for locking said shafts in adjusted position.

49. In a machine for making buttons, the combination with an intermittently revoluble work support, a plurality of gripping devices thereon, and longitudinally movable revoluble cutters, of adjustable members adapted to be set by the gripping members, axially movable shafts having cams arranged to coöperate with the cutters, and arms adapted to be operated by said members and extending into proximity with the shafts and cams, the latter being adapted to coöperate with the arms to adjust the respective shafts relatively to the work support.

50. In a machine for making buttons, the combination with an intermittently revoluble work support, a plurality of gripping devices thereon, and longitudinally movable revoluble cutters, of axially movable shafts, cams thereon adapted to operate the cutters relatively to the work support, adjustable members adapted to be operated by one of the adjustable members, an arm extending into proximity to each shaft and adapted to be operated by one of the adjustable members, mechanism for locking the arms in adjusted positions, and cams on the shafts adapted to engage the arms to shift their respective shafts relatively to the work support.

51. In a machine for making buttons, the combination with an intermittently revoluble work support, a plurality of gripping devices thereon, and axially movable revoluble roughening and finishing cutters, of two separately movable members arranged to coöperate successively with the gripping devices, arms adapted to be positioned by said members, axially movable shafts, one for each cutter, each shaft having a cam arranged to coöperate with one of the arms to automatically adjust it relatively to the work support and also arranged to coöperate with the second cam for reciprocating its respective cutter, and mechanism for securing the arms in their adjusted positions during the forward movement of the cutters in one direction.

52. In a machine for making buttons, the combination with an intermittently revoluble work support, and gripping devices thereon, and axially movable revoluble roughening and finishing cutters, of similarly adjustable and conjointly operable cam shafts, a main driving shaft, means adapted to be operated thereby for revolving and locking the work support, means adapted to be operated by the gripping device for adjusting the cam shafts relatively to the work support, mechanism for intermittently locking the cam shafts in adjusted positions, and driving connection between the main shaft, the cam shafts and the cutters.

53. In a machine for making buttons, the combination with a work piece support, of a pair of boring tools arranged to coöperate with opposite sides of a work piece on the support and a device arranged to coöperate with the work piece and tools for determining the depth of the cuts of the respective tools relatively to the surface of the work piece.

ROBERT B. COCHRANE.

Witnesses:
G. WILLARD RICH,
FLORENCE E. FRANCK.